July 1, 1958 R. C. O'BRIEN 2,841,062

PHOTOTYPESETTING APPARATUS

Filed May 27, 1954 2 Sheets-Sheet 1

INVENTOR.
RICHARD C. O'BRIEN
BY
Marechal, Biebel, French & Bugg
ATTORNEYS

July 1, 1958 R. C. O'BRIEN 2,841,062

PHOTOTYPESETTING APPARATUS

Filed May 27, 1954 2 Sheets-Sheet 2

INVENTOR.
RICHARD C. O'BRIEN
BY
Marechal, Biebel, French & Bugg
ATTORNEYS

United States Patent Office 2,841,062

Patented July 1, 1958

2,841,062

PHOTOTYPESETTING APPARATUS

Richard C. O'Brien, Dayton, Ohio, assignor to Harris-Intertype Corporation, a corporation of Delaware Application May 27, 1954, Serial No. 432,729

5 Claims. (Cl. 95—4.5)

This invention relates to photocomposing apparatus wherein a photographic image of selected composition is recorded on a photosensitive record such as a film or the like.

The photocomposing apparatus incorporates a master character carrier in the form of a rotating disk or the like, and an image of each successive selected character is projected by a light beam and lens system onto the record film. The film travels or advances between projections of successive characters to provide for the formation of the character images and necessary word spaces into a predetermined selected line of composition. The size of each character image as reproduced depends upon the projection lens system, since the distance from the carrier to the record strip is preferably fixed, and a projection lens of given focal length and spacing from the carrier will focus an image of a specific size on the record film determined by the geometry of the optical system. If this same lens is moved with respect to the carrier, however, the image it forms will not be in the same image plane as before nor will it be of the same size.

These relationships and the laws of optics relevant thereto offer both advantages and disadvantages in a photocomposing system. A major advantage derives from the fact that images of different sizes can be produced from a single set of master characters as compared with the variety of different type sizes required for conventional type setting. On the other hand, since a lens of given focal length will form an image of only one size when its distance to the master carrier and to the recorded image plane is fixed, special provision must be made to obtain images of other sizes.

It is accordingly a major object of the present invention to provide photocomposing apparatus having an optical system which utilizes a single lens to produce images of different sizes in the same image plane from the same master character carrier and which is therefore of simple construction and avoids the complications and expense of multiple matched lenses.

In accordance with the invention, this desired object is achieved in its simplest form by interposing an optical flat of greater refractive index than air in the optical path between the fixed object plane and the fixed image plane to utilize the property of such an optical flat of extending the actual path of light rays passing therethrough while maintaining the same size for the image carried by such rays as if the rays traveled through only the actual equivalent distance in air. Thus with the lens positioned to form an image of desired size in a plane spaced forwardly of the fixed image plane, the optical flat is interposed between the lens and the image and is proportioned with respect to thickness and refractive index to extend the actual paths of the image-carrying rays by the proper distance to cause the image to appear in the desired fixed image plane while maintaining the proper air-equivalent image distance to give the desired image size. Further variation of the image sizes formed from the same master object are readily achieved by properly correlated positioning of the lens in combination with additional optical flats of the proper thickness and refractive index.

It is therefore a further object of the invention to provide photocomposing apparatus including a master character carrier and a record film wherein the optical system for projecting the image of each selected character onto the record film comprises a single projection lens which is movable axially to vary the size and position of the image formed thereby, together with one or more optical flats movable selectively, in correlated relation with the movement of the lens, into the path of the beam from the character carrier to the record film to cause the image formed by the lens to be properly focused on the record film.

Additional objects and advantages will be apparent from the following description, the accompanying drawing and the appended claims.

In the drawings—

Figure 1:
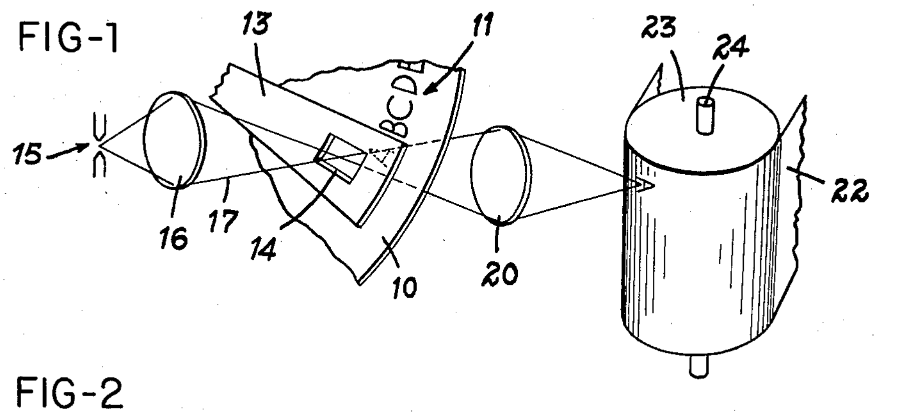
Fig. 1 is a diagrammatic view in the nature of a perspective illustrating the essentials of the system for illuminating and photographing the successive selected characters in a photocomposing system.

Referring to the drawing, which illustrates preferred embodiments of the invention, Fig. 1 shows fragmentarily a rotatable disk 10 in the form of a master stencil carrying a plurality of selected characters 11 shown as the letters of the alphabet. An opaque mask 13 in close proximity with the disk 10 is provided with a rectangular opening 14 corresponding in size with the largest of the characters 11 to be photographed. Along a line through this opening and normal to the disk 10 is a controlled light source 15, which may be a spark gap or other type of discharge device capable of emitting an intense light for a very brief period, together with a condensing lens 16 for collimating the light from the source 15 into a beam 17 for projection through the opening 14.

On the opposite side of the disk 10 from the light source 15 and condensing lens 16, and directly in line therewith, is a projection lens 20 which for simplicity is shown as a simple lens but may of course be a compound lens of suitable optical characteristics. Beyond the lens 20 is a record shown as a film 22 traveling over a drum 23 on a driven shaft 24 and arranged also for properly timed lateral movements as each image is formed thereon. For preferred operation, the master disk 10 and film 22 are at a fixed distance apart, and in the system of Fig. 1, the lens 20 is of such selected focal length and spacing from the disk 10 that the image formed thereby will focus in a fixed image plane 25 coinciding with the aligned portion of film 22, as indicated by the image 11' in Figs. 1 and 2.

Figure 2:
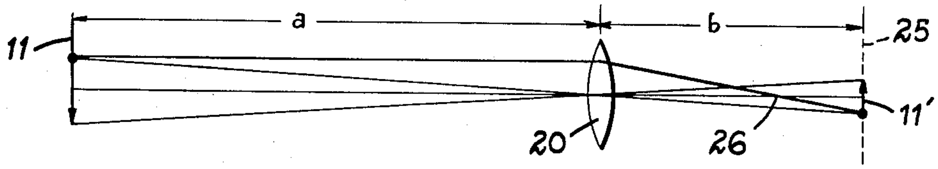
Fig. 2 is a ray diagram further illustrating the system of Fig. 1.

Fig. 2 illustrates in simplified form a portion of the optical system of Fig. 1 in which the object 11 corresponds to any one of the characters 11 in Fig. 1, the distance from the object to the lens 20 is identified as $a$, the distance from the lens to the image is identified as $b$, and the lens 20 is indicated as of such focal length $f$ as to place its focal points at the positions 26. Similarly, the distance from the object to the adjacent focal point 26 is identified as $a'$, and the corresponding distance from the image to the adjacent focal point 26 is identified as $b'$. In accordance with the applicable law of optics, and assuming the lens to be infinitely thin:

$$\frac{1}{a}+\frac{1}{b}=\frac{1}{f}$$

The magnification (M) or ratio of image size to object size is equal to $b/a$, and it may also be stated as equal to $f/a'$ or $b'/f$.

Figure 3:
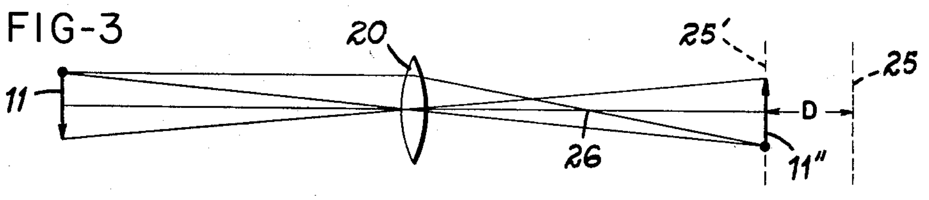
Fig. 3 is a ray diagram similar to Fig. 2 illustrating how movement of the lens closer to the object from its position shown in Fig. 2 causes the image to appear larger and in a different image plane.
Figure 4:
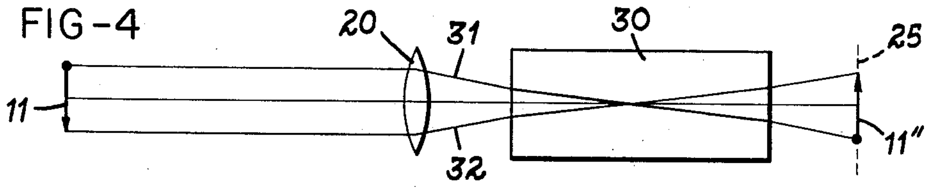
Figs. 4, 5 and 6 illustrate the application of the invention to the system of Fig. 3 to cause the image to appear in the same image plane as in Fig. 2 without changing the size.

Fig. 3 illustrates the result of shifting the lens 20 toward the disk 10 from its position shown in Fig. 2 through a distance such that the image 11'' lies in an image plane 25' spaced by a distance D from the fixed image plane 25. Since this shift will also increase the ratio $f/a'$, the image 11'' will be larger than the image 11' of Fig. 2. Fig. 4 illustrates an optical system in accordance with the present invention by which the image 11'' of Fig. 3 is caused to be focused in the fixed image plane 25 while maintaining its greater size as compared with the image 11'.

Referring to Fig. 4, an optical flat 30 of glass, or other transparent material of higher refractive index than air, is interposed between the lens 20 and the image plane 25. The flat 30 is of such thickness and refractive index that it has the effect of increasing the actual path of the image carrying rays, represented by the rays 31 and 32, while retaining such increased path as the equivalent of the path in air required to cause these rays to focus in the plane 25'. This result derives from the action of the flat 30 to decrease the angle of convergence between the rays 31 and 32 and thus to extend the distance through which these rays must travel before converging. In accordance with the invention, the optical flat 30 is of such thickness and refractive index that it will extend the actual distance $(a+b)$ to equal the distance from the carrier 10 to the image plane 25 while maintaining the ratio of the air-equivalent distance $b$ to the air-equivalent distance $a$, which in this example is also the actual distance $a$, such as to give the desired magnification of image 11'' with respect to object 11. This result is obtained in the illustrated case when the thickness of the flat 30 is equal to $$\frac{ND}{N-1}$$

where N is the refractive index of the flat and D is the distance between the image planes 25 and 25' as shown in Fig. 3.

The operation of this optical system may be more readily appreciated by consideration of an illustrative example as embodied in phototypesetting apparatus. The overall distance $(a+b)$ from the master carrier 10 to the image 25 should first be established in accordance with the desired maximum magnification or minification of the image with respect to the object character, and it will be understood that since it is necessary to form a real image at all times, this distance must be not less than four times the focal length of lens 20. Such proper distance is readily calculated from the above questions. For example, if the maximum minification is selected as $\times/2$ and the focal length $f$ is assumed to be 1 inch, then—

$$a'=f/.5=2 \text{ inches}$$
$$b'=.5/f=.5 \text{ inch}$$
$$a+b=3+1.5=4.5 \text{ inches}$$

In applying these illustrative values to Fig. 2, and assuming a height for the object 11 on carrier 10 of .1 inch, the lens 20 will form a sharp image in the plane 25 if $a$ is equal to 3 inches and $b$ is equal to 1.5 inches. Since the magnification of the image in that setting of the lens will be $\times/2$, the height of the image will be .05 inch. If now it is desired to form an image of the same size as the object, then the ratios $b/a$ and $f/a'$ must equal 1:1, and therefore $a'$ will be equal to 1.0 inch and $a$ must be equal to 2 inches. Referring therefore to Fig. 3, if the object distance $a$ is 2 inches and the image size is to be the same as the object size, the image distance $b$ must also be 2 inches. It follows that the distance D between the new image plane 25' and the fixed image plane 25 is 0.5 inch.

In order to maintain the new image size but to cause it to focus in the fixed image plane 25, it is therefore necessary in accordance with the invention to insert between the lens and the image an optical flat 30 of the proper thickness and refractive index determined as pointed out above. If for the sake of illustration it is assumed that the flat is formed of glass having a refractive index of 1.5, then $$\frac{ND}{N-1}=1.5 \text{ inches}$$

When such an optical flat 30 is positioned as shown in Fig. 4, it provides an actual path for the light rays of 1.5 inches, which is equivalent to only 1 inch in air, and since the image distance $b$ should be equal to 2 inches in air, the actual path will comprise 1 inch in air and 1.5 inches in the flat 30 to give the actual total of 2.5 inches required to locate the image in the fixed image plane 25.

Figure 5:
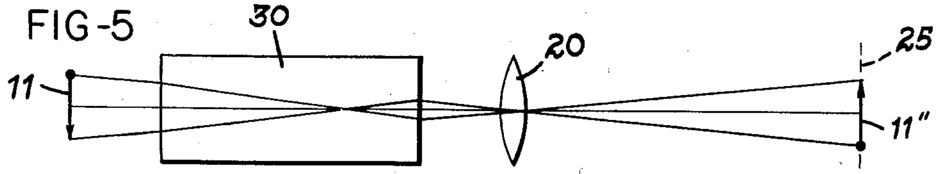

The same effective result may also be obtained in accordance with the invention by shifting the lens 20 to a position 2 inches from the image plane 25 and then placing the flat 30 between the carrier 10 and the lens, and the same flat may be used as in the above example. Such arrangement is shown in Fig. 5, and it will be apparent that if the flat 30 is 1.5 inches in thickness and has a refractive index of 1.5, then while the actual distance $a$ will equal 2.5 inches, this is equivalent to only 2 inches in air. Therefore, the ratio of the distance $b$, which is both the actual air distance and the air-equivalent distance, to the air-equivalent distance $a$ will be 1:1.

Figure 6:
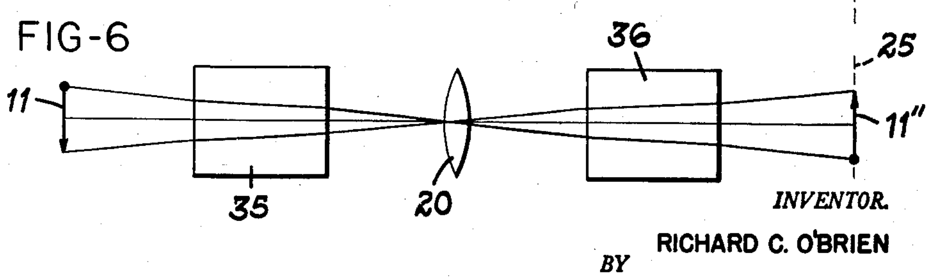

It is also possible in accordance with the invention to obtain the same result by locating the lens 20 in still another position and by interposing optical flats on both sides thereof. Such arrangement is shown in Fig. 6, in which there is a flat 35 positioned between the object 11 and the lens, and a second flat 36 is positioned between the lens and the image. In order to accomplish the same results as in Figs. 4 and 5, it is necessary that the aggregate effective thickness of the two flats 35 and 36 be equal to the thickness of the single flat 30 in Figs. 4 and 5. Thus in the above specific example, the same desired result is obtained if the lens 20 is positioned midway between the carrier 10 and the image plane 25, and if each of the flats 35 and 36 has a thickness of .75 inch and a refractive index of 1.5. It will be apparent that many variations of this arrangement are possible providing the essential relationships are maintained as discussed above.

This system as described in connection with Figs. 4–6 is readily multiplied to provide for the formation of a plurality of image sizes from each of the characters 11 on the disk 10 and utilizing only the single projection lens 20, it being understood that such reference to a single lens includes a compound or multiple lens in a single mount. Figs. 7–10 illustrate such an optical system embodied in a phototypesetting apparatus in which the condensing lens 16 and record film 22 are shown diagrammatically similarly to Fig. 1.

Figure 7:
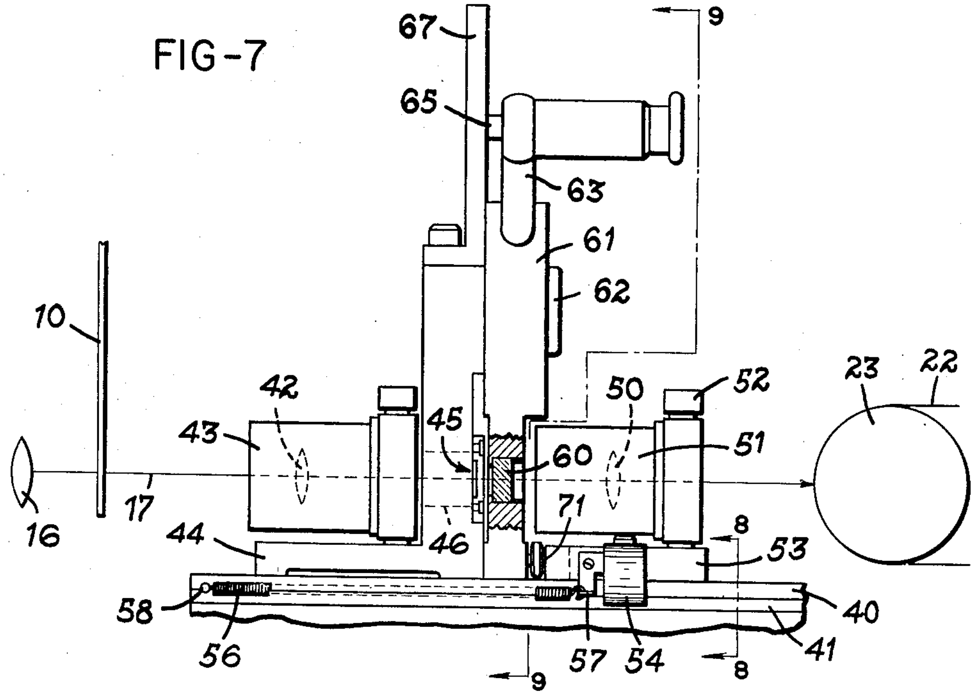
Fig. 7 is a somewhat diagrammatic side view illustrating a portion of a phototypesetting apparatus embodying an optical system in accordance with the present invention.

Referring to Fig. 7, the several parts of the optical system are mounted on a base plate 40 having track grooves 41 in the sides thereof. This system includes a fixed lens indicated diagrammatically at 42 in a mount assembly 43 carried by a bracket 44 which is secured on the base plate in such spaced relation of this lens to the carrier disk 10 as to produce images of smaller size than the characters 11 on the disk. The bracket 44 is also shown as incorporating an adjustable baffle unit 45 for masking stray light which might otherwise interfere with the sharpness of the image produced by lens 42, this baffle controlling a passage 46 for the light beam through bracket 44. The fixed lens 42 thus cooperates with the carrier 10 to define a fixed image plane which in turn becomes the object plane for the movable lens indicated diagrammatically at 50, which corresponds to the lens 20 and is in fact a compound lens in a mount or barrel 51.

Figures 8, 9, 10:
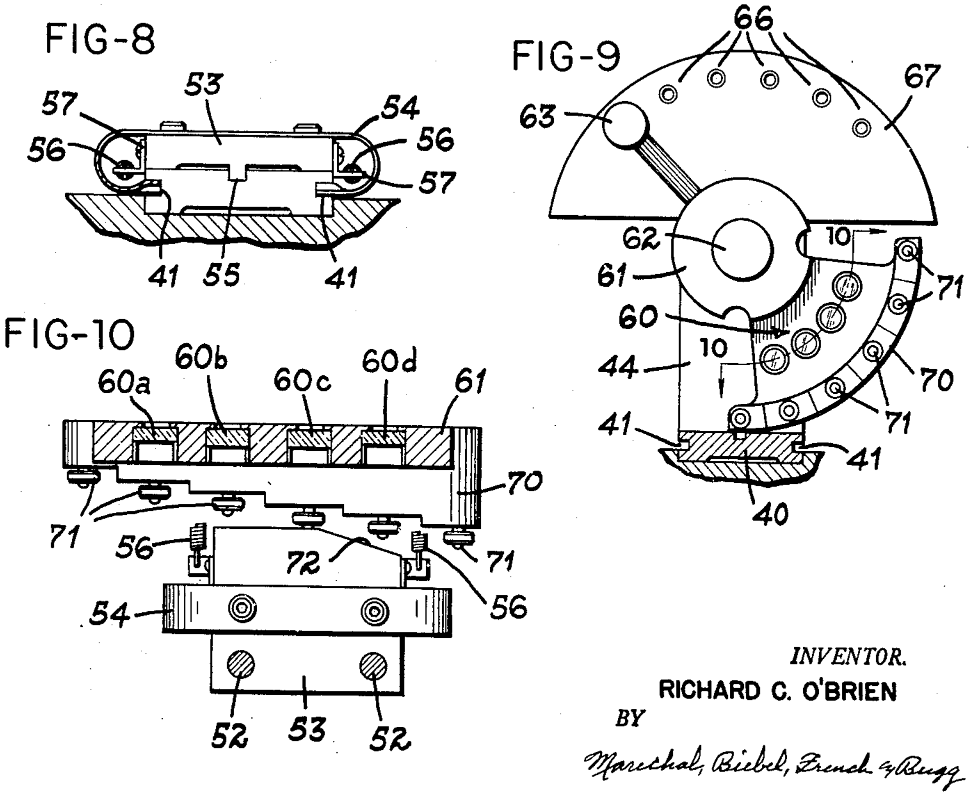
Fig. 8 is a fragmentary section on the line 8—8 of Fig. 7.
Fig. 9 is a view taken as indicated by the line 9—9 of Fig. 7.
Fig. 10 is a somewhat diagrammatic developed section taken approximately on the line 10—10 of Fig. 9.

The mount 51 for the lens 50 is mounted by bolts 52 on a slide 53 held in slidable relation on the track 40 by a spring 54 of generally C-shape having its ends engaging within the track grooves 41. The slide 53 is guided on the track 40 by means of the tongue and groove connection 55 (Fig. 10). A pair of springs 56 urge the slide 53 towards the fixed lens 42, these springs being secured at their opposite ends to brackets 57 on the slide and to pins 58 projecting from the sides of the base plate. The springs 56 thus bias the lens 50 toward the fixed object plane for this lens established by the lens 42 as outlined above, and the lens 50 is movable against springs 56 to a plurality of positions in which it will focus images of the image produced by the fixed lens at different magnifications and at correspondingly different image planes in addition to the fixed image plane corresponding to the record film 22.

A plurality of optical flats designated at 60*a*–60*d* respectively are provided for movement selectively into the path of the light between the lens 50 and its object plane. These flats 60 are mounted in a carrier 61 mounted for rotational movement with a shaft 62 journaled in the bracket 44. A handle 63 for the flat carrier 61 includes a spring-loaded indexing plunger 65 cooperating with a plurality of complementary bores 66 in a plate 67 also mounted on the bracket 44, and the plunger 65 thus indexes the carrier 61 to positions aligning each selected flat 60 in line with the beam path between lens 42 and 50.

The optical flats 60*a–d* are respectively of such thickness and refractive index as outlined above that each will cooperate with the lens 50 in a different proper moved position of the lens to focus an image of a desired different magnification on the record film 22. In the particular illustrated arrangement, means are provided for shifting the lens to positions on both sides of its position in which it will form an image of the same size as its object, and two flats are arranged to cooperate with the lens in forming images having magnifications of less than one, while the other two flats cooperate with the lens to form images having magnifications greater than one. This makes it possible to utilize the flats in pairs of equal thickness, namely one pair 60*a* and 60*d* being of the same thickness and the other pair 60*b* and 60*c* being similarly of the same thickness, and it will be apparent that this arrangement is illustrative of other and more complex arrangements utilizing additional flats in accordance with the invention to give a greater variety of magnifications. Provision is also made for utilizing the lens 50 in two positions requiring no flat and thus corresponding generally to the illustration in Fig. 2.

Cooperating cam means on the flat carrier 61 and the lens supporting slide 52 provide for the desired shifting of the lens 50 to the proper moved position corresponding to the indexed position of the flat carrier. The flat carrier 61 is provided with a stepped peripheral portion 70 which in turn carries a plurality of adjustable camming buttons 71 arranged to cooperate with a beveled cam face 72 on one corner of the slide 52. There is a button 71 for each of the flats 60, and two additional buttons 71 are located in such positions on the flat carrier 61 as to index the lens 50 as stated to a position in which it will focus an image of desired size on the record film 22 without an optical flat in the beam path. More specifically, these parts are so arranged that the two outer buttons 71 will locate the lens 50 in such position as to focus on the record 22 images of approximately 4:3 and 3:4 magnification respectively.

In operation, the flat carrier 61 is initially indexed in accordance with the desired degree of magnification of the final image on the record film 22. Such setting of the flat carrier 61 corresponds to selection of a desired type size in a type setting operation. The indexing movement of the flat carrier 61 causes corresponding movement of the lens supporting slide 52 as the result of the operation of the camming buttons 71 in opposition to the springs 55, and in the initial adjustment of the device, it is merely necessary to adjust the buttons 71 to the extent required to make certain that in each indexed position of the carrier 61, the lens 50 will be adjusted to the proper position such that it will focus an image of the corresponding magnification on the record film 22.

It will accordingly be seen that this invention makes available a photocomposing system having substantial practical advantages. In particular, it makes possible the formation of images of multiple different sizes from a single master character carrier without requiring expensive optical parts such as multiple prisms or matched lenses. In contrast to such more complicated parts, optical flats are comparatively simple and inexpensive to produce with the proper degree of accuracy, and also the positioning of the flat in the system of the invention is not critical so long as it lies between the lens and the actual image plane of the lens with its working surfaces normal to the light beam. From all these standpoints, this invention is therefore a valuable contribution to the art of photocomposing.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A photocomposing apparatus for producing photographic images of selected characters of predetermined different magnifications on a photosensitive record in a fixed image plane from means defining a fixed object plane including a character carrier having thereon a plurality of characters of fixed sizes, comprising means for projecting a light beam from a selected character on said carrier onto said record, a projection lens of predetermined focal length located in the path of said beam from said object plane to said record to form said image, means supporting said lens in a first position in predetermined spaced relation with said object plane causing said image to be focused at a first magnification in said fixed image plane, an optical flat adapted to be positioned in said beam path to provide a greater actual distance between said lens and one of said fixed planes than the air-equivalent distance therebetween, the thickness of said flat being equal to $$\frac{ND}{N-1}$$

where N is the refractive index of said flat and D is the distance between said fixed image plane and a second plane in which said image would be focused by said lens at a predetermined second magnification in the absence of said flat, means for interposing said flat in said beam path, and means coordinated with said interposing means for shifting said lens axially of said beam to a second position causing said image to be focused in said fixed image plane while establishing a ratio of the air-equivalent distance between said lens and said fixed image plane to the air-equivalent distance between said lens and said object plane equal to said predetermined second magnification.

2. An optical system for producing photographic images of different sizes on a photosensitive record in a photocomposing apparatus including a character carrier having thereon a plurality of characters of fixed sizes and means for projecting a light beam from a selected character on said carrier to said record, comprising means cooperating with said carrier to define a fixed object plane, means for mounting said record for travel in an image plane at a fixed distance from said object plane between projections of successive characters on said carrier, a projection lens of predetermined focal length located in the path of said beam from said object plane to said record to form said image, means supporting said lens for movement axially of said plane, a plurality of optical flats adapted to be selectively positioned in said beam path to provide greater actual distances between said lens and one of said fixed planes than the corresponding air-equivalent distances therebetween, the thickness of each of said flats being equal to $$\frac{ND}{N-1}$$

where N is the refractive index of said flat and D is the distance between said fixed image plane and a different plane in which said image would be focused by said lens at a predetermined different magnification in the absence of said flat, means for selectively interposing each of said flats in said beam path, and means responsive to interposing of each selected said flat in said beam path for shifting said lens axially of said beam to a different position causing said image to be focused in said fixed image plane while establishing a ratio of the air-equivalent distance between said lens and said fixed image plane to the air-equivalent distance between said lens and said object plane equal to the predetermined different magnification corresponding to the selected said flat.

3. An optical system for producing photographic images of different sizes on a photosensitive record in a photo composing apparatus including a character carrier having thereon a plurality of characters of fixed sizes and means for projecting a light beam from a selected character on said carrier to said record, comprising means cooperating with said carrier to define a fixed object plane, means for mounting said record in an image plane at a fixed distance from said object plane, a projection lens of predetermined focal length located in the path of said beam from said object plane to said record to form said image, a support for said lens movable axially of said beam, means biasing said lens support toward one of said fixed planes, a plurality of optical flats adapted to be selectively positioned between said lens and said one plane to provide greater actual distances between said lens and said plane than the corresponding air-equivalent distances therebetween, the thickness of each of said flats being equal to $$\frac{ND}{N-1}$$

where N is the refractive index of said flat and D is the distance between said fixed image plane and another plane in which said image would be focused by said lens at a predetermined different magnification in the absence of said flat, a carrier for said flats supported for movement transversely of said beam to interpose each of said flats selectively between said lens and said one plane, cooperating cam means on said flat carrier and said lens support for causing shifting of said lens to one of a plurality of moved positions with respect to said one plane in response to movement of said flat carrier to a position aligning a selected said flat with said beam, and said cam means being correlated with said flats to establish a ratio of the air-equivalent distance between each said moved lens position and said fixed image plane to the air-equivalent distance between said moved lens position and said object plane equal to the predetermined different magnification corresponding to the aligned said flat.

4. An optical system as defined in claim 3 including means defining an indexed position of said flat carrier wherein none of said flats is aligned with said beam, and cooperating cam means on said flat carrier and said lens support responsive to movement of said flat carrier to said indexed position for shifting of said lens to a moved position causing said image to be formed in said fixed image plane at still another predetermined magnification.

5. An optical system for producing photographic images of different sizes on a photosensitive record in a photocomposing apparatus including a character carrier having thereon a plurality of characters of fixed sizes and means for projecting a light beam from a selected character on said carrier to said record, comprising means cooperating with said carrier to define a fixed object plane, means for mounting said record for travel in an image plane at a fixed distance from said object plane between projections of successive characters on said carrier, projection lens means for cooperation with said beam to form the image of each successive said character, shiftable means for supporting said lens means in a plurality of selected different positions each having a predetermined spaced relation with said object plane causing said image to be focused at a corresponding plurality of different magnifications each in a different image plane, a plurality of optical flat means each related to a different one of said selected positions of said lens means and adapted to be selectively positioned in said beam path between said fixed planes to provide greater actual distances between said lens means and one of said fixed planes than the corresponding air-equivalent distances therebetween, each said flat means being of a thickness equal to $$\frac{ND}{N-1}$$

wherein N is the refractive index of said flat means and D is the distance between said fixed image plane and the plane in which said image would be focused by said lens means in said related position in the absence of said flat means, and means for shifting said flat means in coordinated relation with said lens means such that in each said selected position of said lens means the related said flat means will be interposed in said beam path to cause the image to be focused in said fixed image plane in all said positions of said lens means.

References Cited in the file of this patent

UNITED STATES PATENTS

| | | |
|---|---|---|
| 2,233,441 | Whittaker | Mar. 4, 1941 |
| 2,421,656 | Smith | June 3, 1947 |
| 2,554,679 | Mitchell | May 29, 1951 |

FOREIGN PATENTS

| | | |
|---|---|---|
| 411,617 | Germany | Mar. 27, 1925 |

OTHER REFERENCES

Text "Photographic Optics and Color Photography," by G. L. Johnson, 1909, pages 200–203, published by Ward & Co., London.